United States Patent
Song et al.

(10) Patent No.: US 6,251,309 B1
(45) Date of Patent: Jun. 26, 2001

(54) METHOD OF MANUFACTURING LARGE-GRAINED URANIUM DIOXIDE FUEL PELLETS CONTAINING $U_3O_8$

(75) Inventors: Kun-Woo Song; Keon-Sik Kim; Ki-Won Kang; Jong-Hun Kim; Youn-Ho Jung, all of Daejeon-Si (KR)

(73) Assignees: Korea Atomic Energy Research Institute, Daejeon-Si; Korea Electric Power Corporation, Seoul, both of (KR)

( * ) Notice: Subject to any disclaimer, the term of this patent is extended or adjusted under 35 U.S.C. 154(b) by 0 days.

(21) Appl. No.: 09/357,169

(22) Filed: Jul. 19, 1999

(30) Foreign Application Priority Data

Mar. 5, 1999 (KR) .................................... 99-7332

(51) Int. Cl.$^7$ .............................. G21G 4/00; G21C 21/00
(52) U.S. Cl. ............................................ 252/643; 264/0.5
(58) Field of Search .................................. 423/260, 261, 423/253; 264/0.5; 252/636, 643

(56) References Cited

U.S. PATENT DOCUMENTS

| | | | |
|---|---|---|---|
| 4,985,183 | * | 1/1991 | Yato et al. .............................. 264/0.5 |
| 5,211,905 | * | 5/1993 | Wood .................................... 376/261 |
| 5,514,306 | * | 5/1996 | Larson et al. ......................... 264/0.5 |
| 5,597,538 | * | 1/1997 | Taylor et al. ............................. 423/3 |

* cited by examiner

*Primary Examiner*—Steven Bos
(74) *Attorney, Agent, or Firm*—Arent Fox Kintner Plotkin & Kahn, PLLC

(57) ABSTRACT

Disclosed is a method of manufacturing large-grained uranium dioxide pellets through the use of $U_3O_8$ single crystals. The method consists of two main steps; producing $U_3O_8$ single crystals and manufacturing large-grained $UO_2$ pellets. The $U_3O_8$ single crystals are produced by annealing $U_3O_8$ powder to make $U_3O_8$ polycrystalline aggregates having a large crystal size, and by dividing the $U_3O_8$ polycrystalline aggregate into its constituent $U_3O_8$ single crystals. Large-grained $UO_2$ pellets are produced by forming a mixture comprising $UO_2$ powder and the $U_3O_8$ single crystals, making granules of the mixture, pressing the granules into green pellets, and sintering the green pellets above 1600° C. for more than one hour in a reducing gas. The $U_3O_8$ powder is produced preferably by heating defective $UO_2$ pellets in air to oxidize $UO_2$ to $U_3O_8$. The invention provides a method of manufacturing a large-grained $UO_2$ pellet with defective pellets reused.

10 Claims, 2 Drawing Sheets

METHOD OF MANUFACTURING LARGE-GRAINED URANIUM DIOXIDE FUEL PELLETS CONTAINING $U_3O_8$

BACKGROUND OF THE INVENTION

The present invention relates to a method of manufacturing uranium dioxide fuel pellets. Particularly, this invention relates to a method of making $U_3O_8$ single crystals and manufacturing large-grained uranium dioxide ($UO_2$) fuel pellets through the use of a mixture comprising $UO_2$ powder and $U_3O_8$ single crystals.

Uranium dioxide ($UO_2$) fuel pellets have been manufactured using $UO_2$ powder according to the following processes; homogenizing $UO_2$ powder or mixing $UO_2$ powder with other additives, pressing $UO_2$ powder into green pellets, and sintering the green pellets at about 1700° C. in a reducing gas atmosphere to produce $UO_2$ pellets. The $UO_2$ pellet has a cylindrical shape of about 8 mm diameter and 10 mm length, and it has a density of about 95% of theoretical density (TD) and a grain size of about 8 $\mu$m. $UO_2$ pellets are loaded into a zirconium-based tube, which is then seal-welded to fabricate a fuel rod.

The defective $UO_2$ pellets, which do not meet pellet specifications, are usually made in a small quantity during the process of pellet manufacture. Since defective $UO_2$ pellets contain expensive enriched uranium, they are commonly recycled in the manufacture of new $UO_2$ pellets according to the following method. Firstly, $U_3O_8$ powder is made by heating defective $UO_2$ pellets at around 450° C. in air so as to oxidize $UO_2$ to $U_3O_8$, and the $U_3O_8$ powder is then mixed with $UO_2$ powder. Secondly, the mixture of $UO_2$ and $U_3O_8$ powder is pressed and sintered to produce $UO_2$ pellets in the same way as the single $UO_2$ powder. The $U_3O_8$ powder is much less sinterable (capable of getting a high pellet density) than the $UO_2$ powder, so that its content is generally limited within 15% by weight of the mixture of $UO_2$ and $U_3O_8$ powder. The art to improve the sinterability of $U_3O_8$ powder has been disclosed in the literatures of U.S. Pat. No. 3,140,151 and U.S. Pat. No. 3,578,419.

While a fuel rod is irradiated (burned) in a nuclear reactor, the fission gas such as xenon and krypton is generated in a fuel pellet and is released to the outside of the fuel pellet. The pressure in a fuel rod builds up increasingly with burnup. The fission gas released should be maintained as low as possible, for an excessive pressure gives rise to the failure of a fuel rod. In high burnup, the fission gas released may restrict the performance of a fuel rod.

It has been known that a fuel pellet having a large grain provides a good performance since the amount of the fission gas released during irradiation decreases with increasing the grain size of a fuel pellet. It is a common sense that increasing sintering temperature and time makes a large-grained fuel pellet, but such a sintering method is not economical. Therefore, the art has been disclosed which provides a method of manufacturing large-grained $UO_2$ pellets with the aid of sintering additives.

According to the method of U. S. Pat. No. 4,869,867, $UO_2$ fuel pellets having an average grain size of at least 20 $\mu$m are produced by adding aluminosilicate to $UO_2$ powder, pressing and sintering. A shortcoming of the prior art is that the sintering additive may have an adverse effect on the other properties of the $UO_2$ fuel pellet. For example, the sintering additive may degrade thermal properties such as thermal conductivity and melting point.

On the other hand, the art has been known which provides a method of manufacturing a large-grained $UO_2$ pellet with no sintering additive added. U.S. Pat. No. 4,578,229 disclosed a method of sintering $UO_2$ green pellets at a temperature range of 1000° C. to 1400° C. in an oxidizing gas such as carbon dioxide and reducing the sintered pellet at that temperature range in a reducing gas. The prior art has a problem in that a special sintering furnace is needed in which an oxidizing gas and a reducing gas can be used separately.

SUMMARY OF THE INVENTION

The above disadvantages of the prior arts are overcome by the present invention. A principal object of this invention is to provide a method of manufacturing large-grained $UO_2$ fuel pellets in a reducing gas atmosphere with the aid of $U_3O_8$ single crystals.

With the foregoing object and other objects in view, there is provided in accordance with the invention a method of manufacturing large-grained $UO_2$ pellets, comprising annealing $U_3O_8$ powder at temperatures of 1000° C. to 1500° C. in order to produce $U_3O_8$ polycrystalline aggregates having a large crystal size; dividing the $U_3O_8$ polycrystalline aggregate into its constituent $U_3O_8$ single crystals; forming a mixture of $UO_2$ powder and the $U_3O_8$ single crystals; making granules of the mixture; pressing the granules into green pellets; and sintering the green pellets at temperatures above 1600° C. in a reducing gas atmosphere to produce large-grained $UO_2$ pellets.

The method according to the invention is characterized in that the $U_3O_8$ powder is produced preferably by heating defective $UO_2$ pellets at temperatures of 300° C. to 800° C. in an oxidizing gas to oxidize $UO_2$ to $U_3O_8$.

The method according to the invention is characterized in that the mixture includes 1% to 15% by weight of the $U_3O_8$ single crystals.

An advantage of the present invention is that a large-grained $UO_2$ pellet is produced in a reducing gas atmosphere without adding any sintering additives. Another advantage is that defective $UO_2$ pellets can be reused in producing large-grained $UO_2$ pellets, so fuel fabrication cost is saved.

BRIEF DESCRIPTION OF THE DRAWING

Details of this invention will be further understood upon reference to FIG. 1, which shows the manufacturing processes of $U_3O_8$ single crystals and large-grained $UO_2$ fuel pellets.

DETAILED DESCRIPTION OF THE INVENTION

Figure 1:
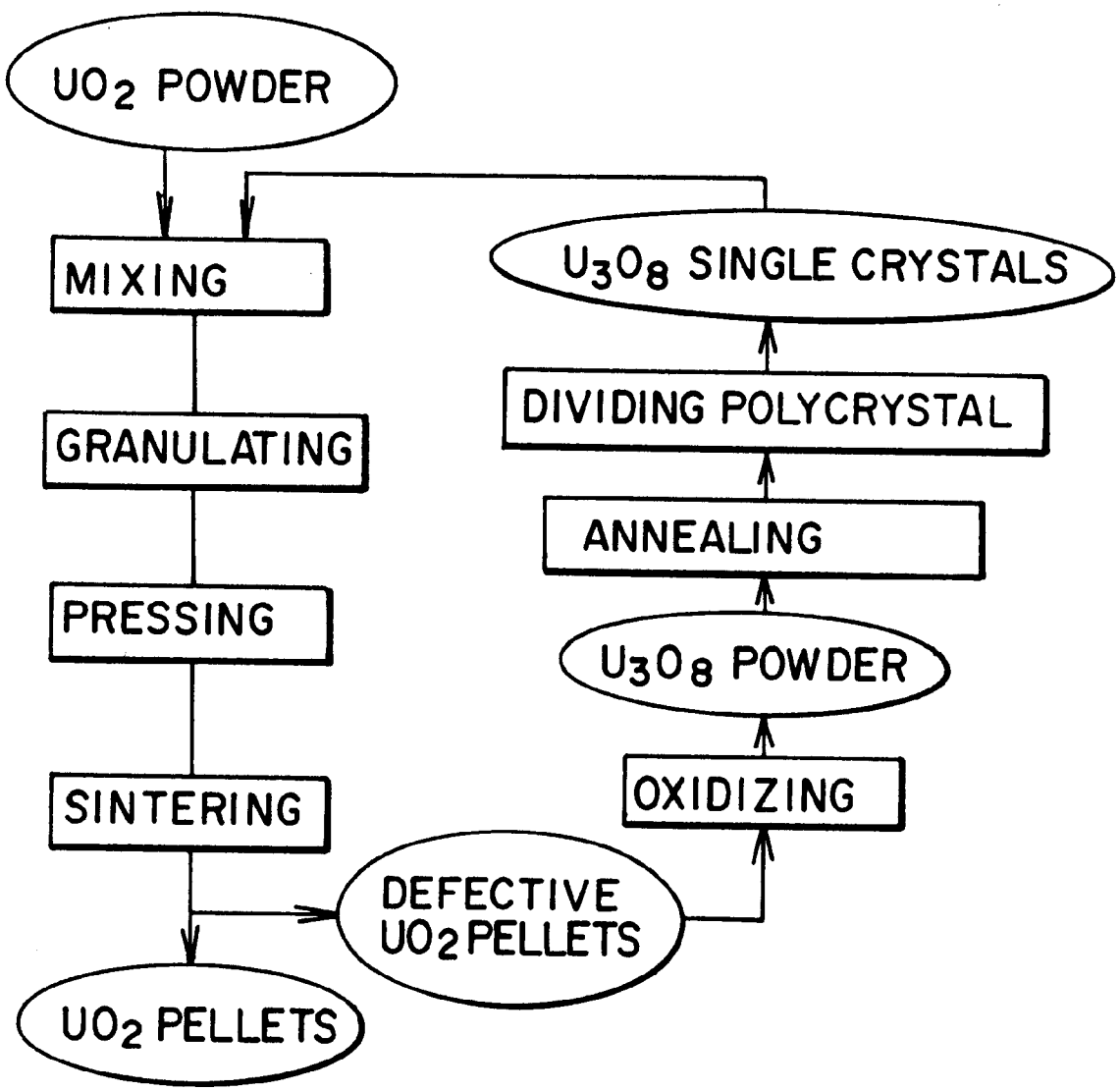

This invention provides the method of manufacturing large-grained $UO_2$ pellets with the aid of $U_3O_8$ single crystals. The method according to this invention comprises two main steps; producing $U_3O_8$ single crystals and manufacturing large-grained $UO_2$ pellets. FIG. 1 shows the manufacturing processes of the $U_3O_8$ single crystals and large-grained $UO_2$ fuel pellets.

The step of producing $U_3O_8$ single crystals comprises annealing $U_3O_8$ powder at temperatures of 1000° C. to 1500° C. for more than 1 hour in a non-reducing gas atmosphere in order to make $U_3O_8$ polycrystalline aggregates having a large crystal size, and dividing the $U_3O_8$ polycrystalline aggregate into its constituent $U_3O_8$ single crystals.

The step of manufacturing large-grained $UO_2$ pellets comprises forming a mixture of $UO_2$ powder and the $U_3O_8$ single crystals, making granules of the mixture, pressing the granules into green pellets, and sintering the green pellets at temperatures above 1600° C. for more than 1 hour in a reducing gas atmosphere. The content of $U_3O_8$ single crystals is in the range between 1% and 15% by weight of the mixture. The reducing gas is hydrogen or a hydrogen containing gas. More detailed descriptions of the invention are as follows.

The $U_3O_8$ powder is made by heating $UO_2$ pellets at temperatures of 300° C. to 800° C. in an oxidizing gas to oxidize $UO_2$ to $U_3O_8$. During the oxidation $UO_2$ pellets are spontaneously pulverized to $U_3O_8$ powder, for the orthorhombic $U_3O_8$ lattice has about 30% larger volume than the cubic $UO_2$ lattice, so that a large amount of stress builds up. The oxidizing gas is air or an oxygen containing gas. As the heating temperature increases, the amount of stress decreases. Thus the size of the $U_3O_8$ powder increases.

Defective or sound $UO_2$ pellets can be so heated and oxidized as to make $U_3O_8$ powder. However, it is more economical to use defective $UO_2$ pellets since defective $UO_2$ pellets which do not meet pellet specifications are usually produced in a small quantity in the manufacturing processes of $UO_2$ pellets. The present invention provides a method of reusing defective $UO_2$ pellets.

The fragments of $UO_2$ pellets are also used in making $U_3O_8$ powder. The $UO_2$ pellet fragments are heated in an oxidizing gas at temperatures of 250° C. to 700° C., which is lower than the temperature for the oxidation of $UO_2$ pellets.

The other method to make $U_3O_8$ powder is to calcine uranium compounds, in which uranium has an oxidation state of 4+ to 6+. On calcining a uranium compound in an oxygen containing gas, it changes to $U_3O_8$ powder with gaseous products released.

Figure 2:
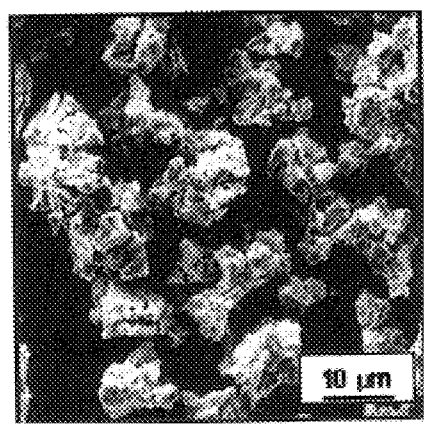
FIGS. 2, 3, and 4 show the morphology of $U_3O_8$ powder, $U_3O_8$ polycrystalline aggregates, and $U_3O_8$ single crystals, respectively.

The $U_3O_8$ powder, which was made from $UO_2$ pellets, pellet fragments and uranium compounds, may include large $U_3O_8$ agglomerates and not-oxidized products, so it is passed through a sieve to eliminate them. The $U_3O_8$ powder has an average size of 5 $\mu$m to 15 $\mu$m, and each particle has many cracks that were formed during the oxidation. A crystal size of the $U_3O_8$ powder is very small, and the morphology of the $U_3O_8$ powder, as an example, is shown in FIG. 2.

Figure 3:
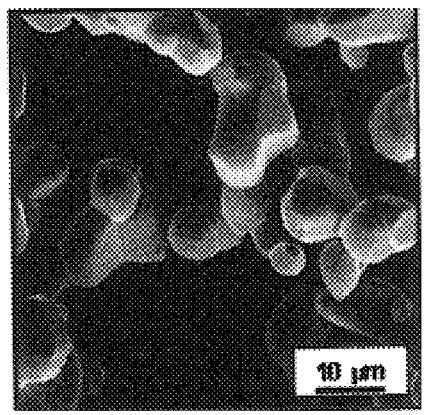

When the $U_3O_8$ powder is annealed at temperatures of 1000° C. to 1500° C., the particles of $U_3O_8$ powder are partially bonded one another and simultaneously very small $U_3O_8$ crystals grow. Thus $U_3O_8$ polycrystalline aggregates are made, each of which consists of many large crystals without cracks. The size of the crystals in the $U_3O_8$ polycrystalline aggregate increases as the annealing temperature and time increase. FIG. 3 shows an example of the morphology of the $U_3O_8$ polycrystalline aggregates.

Figure 4:
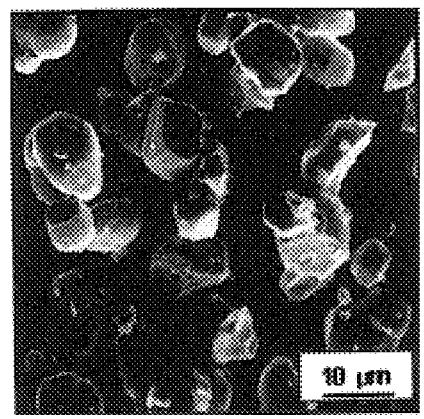

The crystals in the $U_3O_8$ polycrystalline aggregate have a shape of polyhedrons, and they are found to be weakly bonded one another. Thus the $U_3O_8$ polycrystalline aggregate is divided easily into its constituent $U_3O_8$ single crystals by mechanical force. FIG. 4 shows an example of the morphology of the $U_3O_8$ single crystals. The $U_3O_8$ single crystals have an average size of 2 $\mu$m to 30 $\mu$m.

$UO_2$ powder, which is normally used in producing $UO_2$ pellets, is mixed with the $U_3O_8$ single crystals to form a mixture. The content of the $U_3O_8$ single crystals is 1% to 15% by weight of the mixture, and it is preferable for the content to be 2% to 8% by weight. If there is much $U_3O_8$ powder to be reused, the $U_3O_8$ powder is additionally added to the mixture, in which a total amount of both the $U_3O_8$ single crystal and the $U_3O_8$ powder is not larger than 15% by weight of the mixture.

A green pellet made according to the invention consists of mainly $UO_2$ powder and of uniformly dispersed $U_3O_8$ single crystals. Such a green pellet being sintered at temperatures above 1600° C. in a reducing atmosphere, $U_3O_8$ single crystals act as initiators for rapid grain growth. Eventually, the $UO_2$ pellet comes to have uniformly large grains after sintering.

After a green pellet which includes an excessive amount of $U_3O_8$ single crystals had been sintered, it was found that the $UO_2$ pellet did not have a large grain. This is understood by assuming that the grain growth initiated by the $U_3O_8$ single crystal proceeds only in a range that is determined by the spacing between the $U_3O_8$ single crystals. So it is preferable to keep the amount of the $U_3O_8$ single crystals less than about 15% by weight of the green pellet.

If the $U_3O_8$ polycrystalline aggregate is not completely divided, $U_3O_8$ products composed of several single crystals are produced. It was found that a large-grained $UO_2$ pellet could be produced using the $U_3O_8$ products composed of less than about ten single crystals. The $U_3O_8$ products have an average size of less than about 50 $\mu$m. Therefore, the method according to the invention is conducted using the $U_3O_8$ single crystal, the $U_3O_8$ products composed of less than ten single crystals, or mixtures of the $U_3O_8$ single crystals and the $U_3O_8$ products.

The $UO_2$ pellet manufactured according to the invention has a grain size of about 12 $\mu$m after sintering at 1700° C. for 4 hours. Without using the $U_3O_8$ single crystals, the $UO_2$ pellet has a grain size of about 8 $\mu$m, and a grain size of 12 $\mu$m can be achieved only by sintering at 1700° C. for more than 20 hours. The method provided by the present invention has an advantage of increasing the grain size of $UO_2$ pellets by about 50%. The amount of the fission gas released decreases with increasing the grain size of a $UO_2$ pellet, so the large-grained $UO_2$ pellet according to the invention will decrease the amount of the fission gas released during irradiation.

In the other method according to the invention, $UO_2$ single crystals substitute for the $U_3O_8$ single crystals. $UO_2$ single crystals are made simply by reducing the $U_3O_8$ single crystals at temperatures of 400° C. to 1200° C. in hydrogen or a hydrogen containing gas. The $UO_2$ single crystal is identical with the $U_3O_8$ single crystal in shape and size. The other method to make $UO_2$ single crystals comprises reducing the $U_3O_8$ polycrystalline aggregates to $UO_2$ polycrystalline aggregates at temperatures of 400° C. to 1500° C. and dividing the $UO_2$ polycrystalline aggregate into its constituent $UO_2$ single crystals.

When the green pellet which consists of mainly $UO_2$ powder and of uniformly dispersed $UO_2$ single crystals is sintered at temperatures above 1600° C. in a reducing atmosphere, the $UO_2$ single crystals act as initiators for rapid grain growth. Eventually, the $UO_2$ pellet comes to have uniformly large grains after sintering.

Another method of manufacturing large-grained $UO_2$ pellets comprises forming a mixture of $UO_2$ powder and the $UO_2$ single crystals, making granules of the mixture, pressing the granules into green pellets, and sintering the green pellets at temperatures above 1600° C. for more than 1 hour in a reducing gas atmosphere. The content of the $UO_2$ single crystals is not larger than 15% by weight of the mixture. The reducing gas is hydrogen or a hydrogen containing gas.

The following example illustrates a preferred method of manufacturing large-grained $UO_2$ fuel pellets in accordance with the present invention. However, these examples should be understood in no way to limit the scope of the invention, which is only defined by the appended claims.

EXAMPLE $U_3O_8$ single crystals were prepared according to the following procedures. $UO_2$ pellets were oxidized in flowing air at 400° C. for 3 hours to make $U_3O_8$ powder, which was then passed through a 100-mesh sieve to eliminate large $U_3O_8$ agglomerates and not-oxidized products. The $U_3O_8$ powder had an average size of 8 μm, and its morphology is similar to that shown in FIG. 2.

The $U_3O_8$ powder was annealed at 1300° C. for 4 hours in flowing air, and then cooled to make $U_3O_8$ polycrystalline aggregates, whose morphology is similar to that shown in FIG. 3. The $U_3O_8$ polycrystalline aggregate was divided into $U_3O_8$ single crystals by mechanical force and intensive stirring. The complete dividing of the $U_3O_8$ polycrystalline aggregate made a product consisting of 1 to 2 single crystals, and the partial dividing made a product consisting of 3 to 5 single crystals. The former product, which had an average size of 5.5 μm, is termed 'A crystal', and the latter product, which had an average size of 8 μm, is termed 'B crystal'. The morphology of 'A crystal' is similar to that shown in FIG. 4.

The $U_3O_8$ powder was annealed at 1200° C. for 4 hours in flowing air, and then cooled to make $U_3O_8$ polycrystalline aggregates, which were then divided into $U_3O_8$ products consisting of 6 to 10 single $U_3O_8$ crystals. This $U_3O_8$ product, which is termed 'C crystal', has an average size of 8 μm.

Mixtures were prepared by mixing $UO_2$ powder with the A crystal, the B crystal, and the C crystal, respectively. The contents of each crystal were 2%, 4%, 6%, and 8% by weight. The powder mixture was pre-pressed under 100 MPa into slugs, which were then broken up into granules. The granules were pressed under 300 MPa into green pellets, which were then sintered at 1700° C. for 4 hours in hydrogen gas in order to make $UO_2$ pellets.

Table 1 shows the grain size of the $UO_2$ pellets fabricated in accordance with the above procedures. In order to show clearly the effect of the $U_3O_8$ single crystals on the grain size, $UO_2$ pellets were produced using powder mixtures of not containing $U_3O_8$ single crystals. The mixtures of $UO_2$ and $U_3O_8$ powder were pressed and sintered, and the results are also shown in Table 1, as a comparative example.

TABLE 1

Grain size of $UO_2$ pellets.

| type of crystal | contents of crystals in powder mixture (% by weight) | | | | | Remarks |
|---|---|---|---|---|---|---|
| | 0% | 2% | 4% | 6% | 8% | |
| A | 7.6 μm | 7.9 μm | 9.3 μm | 12 μm | 10 μm | |
| B | 7.6 μm | 8.6 μm | 10.3 μm | 11.9 μm | 10.5 μm | |
| C | 7.6 μm | 7.8 μm | 8.1 μm | 9.6 μm | 9.4 μm | |
| $U_3O_8$ powder | 7.6 μm | 7.3 μm | 6.9 μm | 6.9 μm | 6.8 μm | comparative example |

What is claimed is:

1. A method of manufacturing uranium dioxide ($UO_2$) fuel pellets, the method comprising:

annealing $U_3O_8$ powder at temperatures of 1000° C. to 150° C. in a non-reducing gas atmosphere in order to make $U_3O_8$ polycrystalline aggregates having a large crystal size;

dividing the $U_3O_8$ polycrystalline aggregate into its constituent $U_3O_8$ single crystals;

forming a mixture comprising 1% to 15% by weight of the $U_3O_8$ single crystals with the remainder being $UO_2$ powder;

making granules of the mixture;

pressing the granules into green pellets;

sintering the green pellets at temperatures above 1600° C. for more than one hour in a reducing gas atmosphere.

2. The method of claim 1, wherein the $U_3O_8$ powder is produced by heating defective or sound $UO_2$ pellets at temperatures of 300° C. to 800° C. in air or in an oxygen containing gas to oxidize $UO_2$ to $U_3O_8$, and by sieving the oxidized products in order to eliminate large $U_3O_8$ agglomerates and not-oxidized products.

3. The method of claim 1, wherein the $U_3O_8$ powder is produced in a oxygen containing gas by calcining uranium compounds in which uranium has an oxidation state of 4+ to 6+, and by sieving the calcined products in order to eliminate large $U_3O_8$ agglomerates and not-oxidized products.

4. The method of claim 1, wherein the non-reducing gas comprises air, nitrogen, inert gases, oxygen and mixtures thereof.

5. The method of claim 1, wherein the $U_3O_8$ single crystals have an average size of 2 to 30 μm.

6. The method of claim 1, wherein the $U_3O_8$ single crystals further comprise the $U_3O_8$ single crystals, $U_3O_8$ products composed of less than ten $U_3O_8$ single crystals, and mixtures thereof.

7. The method of claim 6, wherein the $U_3O_8$ product has an average size of less than 50 μm.

8. The method of claim 1, wherein the mixture further comprises the $UO_2$ powder, the $U_3O_8$ single crystals, and the $U_3O_8$ powder.

9. The method of claim 8, wherein the total amount of both the $U_3O_8$ single crystals and the $U_3O_8$ powder is not larger than 15% by weight of the mixture.

10. The method of claim 1, wherein the reducing gas comprises at least one gas selected from the group consisting of hydrogen, a mixture of hydrogen and nitrogen, a mixture of hydrogen and inert gas, a mixture of hydrogen and carbon dioxide, and a mixture of hydrogen and steam.

* * * * *